(12) United States Patent
Hulsey et al.

(10) Patent No.: US 6,648,361 B2
(45) Date of Patent: Nov. 18, 2003

(54) PIVOTAL AND REMOVABLE TRAILER HITCH

(75) Inventors: William J. Hulsey, Oak Ridge, TN (US); Michael A. Hulsey, Knoxville, TN (US)

(73) Assignee: Trail Manor, Lake City, TN (US)

( * ) Notice: Subject to any disclaimer, the term of this patent is extended or adjusted under 35 U.S.C. 154(b) by 0 days.

(21) Appl. No.: 10/044,063

(22) Filed: Jan. 10, 2002

(65) Prior Publication Data

US 2003/0127827 A1 Jul. 10, 2003

(51) Int. Cl.⁷ .................................................. B60D 1/46
(52) U.S. Cl. ................................. 280/491.1; 280/491.5
(58) Field of Search ........................... 280/491.1, 491.3, 280/491.4, 491.5

(56) References Cited

U.S. PATENT DOCUMENTS

| | | | | |
|---|---|---|---|---|
| 3,664,687 A | * | 5/1972 | Nutt, Jr. et al. | 280/491.3 |
| 3,765,704 A | * | 10/1973 | Tierno | 280/482 |
| 4,398,742 A | | 8/1983 | Sanders | |
| 4,856,799 A | * | 8/1989 | Hawn | 280/24 |
| 5,465,993 A | * | 11/1995 | Gee et al. | 280/491.5 |
| 5,503,423 A | | 4/1996 | Roberts et al. | |
| 5,755,454 A | * | 5/1998 | Peterson | 280/491.1 |
| 5,890,617 A | | 4/1999 | Rowland et al. | |
| 5,992,871 A | | 11/1999 | Rowland et al. | |

* cited by examiner

Primary Examiner—Kevin Hurley
(74) Attorney, Agent, or Firm—PItts & Brittian, PC

(57) ABSTRACT

A trailer hitch is provided for releasable attachment to a trailer frame. At least one aperture is defined in the trailer frame. The trailer hitch includes an elongated cross member having a first end and a second end, a first side member extending from the first end of the elongated cross member to a coupler and a second side member extending from the second end of the elongated cross member to the coupler. At least one aperture is defined in the trailer hitch in a position of coaxial alignment with the aperture defined in the frame when the trailer hitch is in a towing position A removable lock pin is adapted to extend through the apertures in the frame and the trailer hitch to secure the cross member in a fixed position relative to the frame.

9 Claims, 6 Drawing Sheets

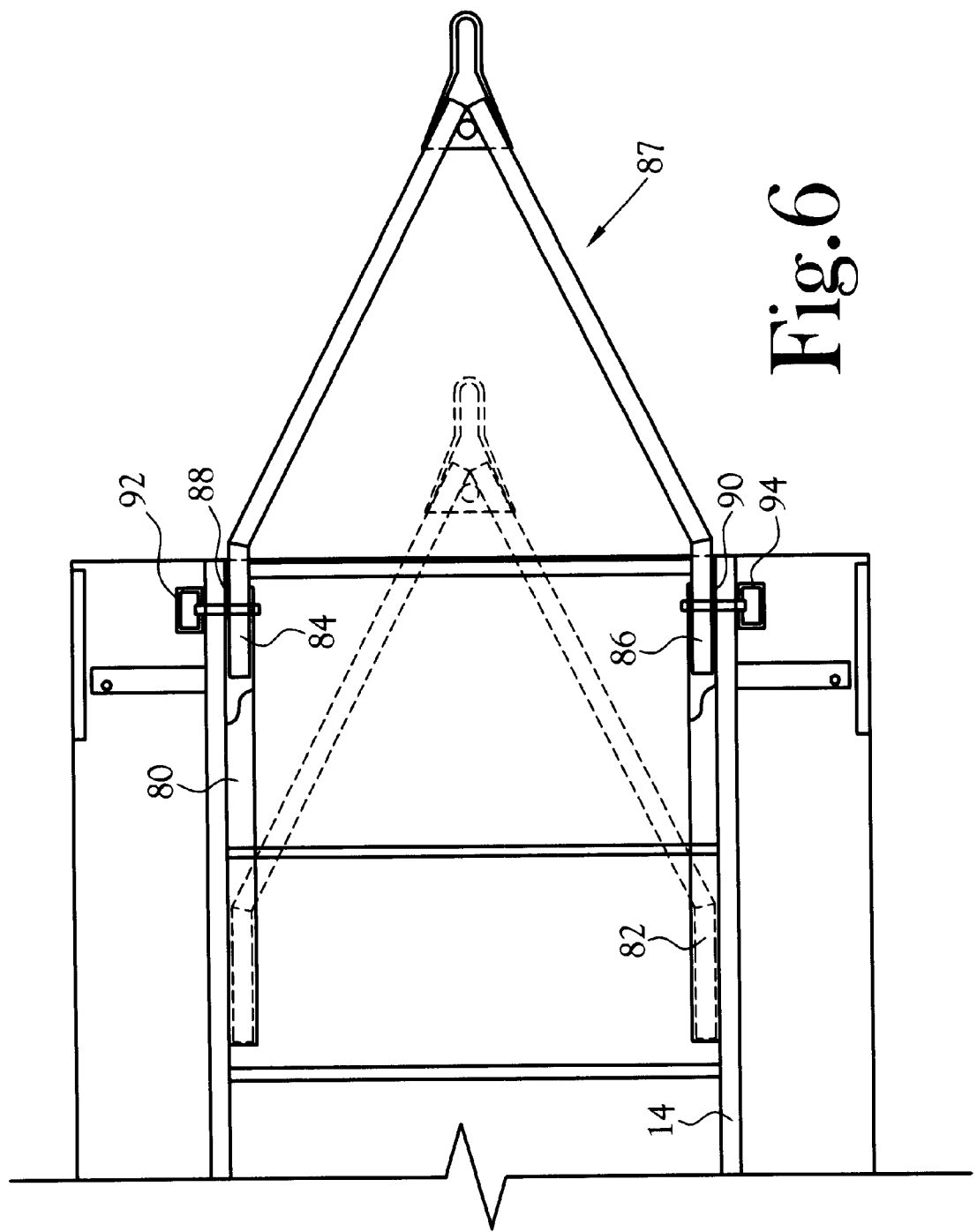

PIVOTAL AND REMOVABLE TRAILER HITCH

CROSS-REFERENCE TO RELATED APPLICATIONS

Not applicable

TECHNICAL FIELD

The present invention relates generally to trailer hitches and more particularly to pivoting and removable hitches for camping trailers.

BACKGROUND OF THE INVENTION

Camping trailers, which include travel trailers, pop-up campers, tent campers, pop-up trailers and tent trailers, for example, are not independently powered. Instead, they are towed to a desired location with a powered vehicle, such as a car or truck, which has a coupling device, such as a ball, secured adjacent the rear bumper of the vehicle. The distal end of the trailer includes a coupler adapted to pivotally engage the coupling device.

Storage space in and around a camping trailer is always at a premium because many campers like to bring along substantial amounts of provisions and equipment when they camp. In the case of camping trailers, it is generally desired to provide a storage area on the frame that extends from the camping trailer to the hitch at the distal end of the frame. This extra storage space is frequently achieved by using a triangular shaped, reinforced frame that extends substantially to the distal end of the frame. Camping trailers tend to be heavier than boat trailers. The "A" shaped frame provides substantial strength to prevent twisting and bending of the distal end portion of the frame. The expanded area also provides desirable support for carrying heavy objects on the frame. Just inboard from the distal end of the frame, where the hitch coupler is located, a retractable support post is mounted. The retractable support post is retracted upwardly during transport, so that it does not engage the road. The retractable support post is then lowered to engage the ground and support the camping trailer when it is parked, thus allowing the hitch coupling to be disengaged and also maintain the camping trailer in a generally horizontal position while parked, even if the ground is not horizontal.

Many camping trailers are over 20 feet in length, exceeding the typical size of a residential garage. As a result of the lengths of camping trailers and the size limitations for storage spaces, especially in garages, it is generally desirable to provide a frame that can be shortened for storage.

Various efforts to shorten trailers have been made in the field of boat trailers. Boat trailers generally have a linear frame section adjacent to the hitch coupling, often referred to as a drawbar or tongue. U.S. Pat. No. 5,890,617 to Rowland et al., U.S. Pat. No. 5,992,871 to Rowland et al., U.S. Pat. No. 5,503,423 to Roberts et al. and U.S. Pat. No. 4,398,742 to Sanders all disclose apparatus for hinged attachment of the drawbar or tongue to the body of a trailer. They do not address the issues involved in pivotal attachment of a triangular-shaped frame, nor the added security features of a removable hitch section.

Accordingly, it is an object of the present invention to provide a camping trailer hitch that shortens the effective length of the trailer when it is parked.

It is also an object of the present invention to provide a pivotal trailer hitch that is stable for road transport.

It is a further object to provide a pivotal trailer hitch that maintains a trailer in a generally horizontal orientation during pivoting.

It is an additional object to provide a pivotal trailer hitch that is removable to prevent theft of the trailer.

Other objects and advantages of the present invention will be recognized when the following description is considered along with the drawings.

SUMMARY OF THE INVENTION

In one embodiment of the present invention, a trailer hitch is provided for pivotal attachment to a trailer frame having an elongated front plate. The trailer hitch includes an elongated cross member having a first end and a second end. A plurality of coaxial pivot apertures is defined in the elongated cross member adjacent to the first end. A plurality of coaxial lock apertures is defined in the elongated cross member adjacent to the second end. A pivot pin is adapted to extend through the pivot apertures and an aperture defined in the trailer frame to permit pivotal movement of the trailer hitch relative to the trailer frame. A removable lock pin is adapted to extend through the lock apertures to secure the cross member in a fixed position relative to the front plate. A first side member extends from the first end of the elongated cross member to a coupler. A second side member extends from the second end of the elongated cross member to the coupler. The cross member, the first side member, and the second side member cooperatively define a generally triangular shape. An elongated support is retractably mounted on the hitch for selective movement in directions generally perpendicular to the plane defined by the triangular shape. A roller is rotatably mounted upon the support post for rolling engagement with the ground.

BRIEF DESCRIPTION OF THE DRAWINGS

The above mentioned features of the invention will become more clearly understood from the following detailed description of the invention read together with the claims and drawings in which:

FIG. 6 is a plan view, partially cut away, of an alternative embodiment of a trailer hitch in accordance with the present invention in a phantom retracted position and in an extended position.

BEST MODE FOR CARRYING OUT THE INVENTION

Figure 1:
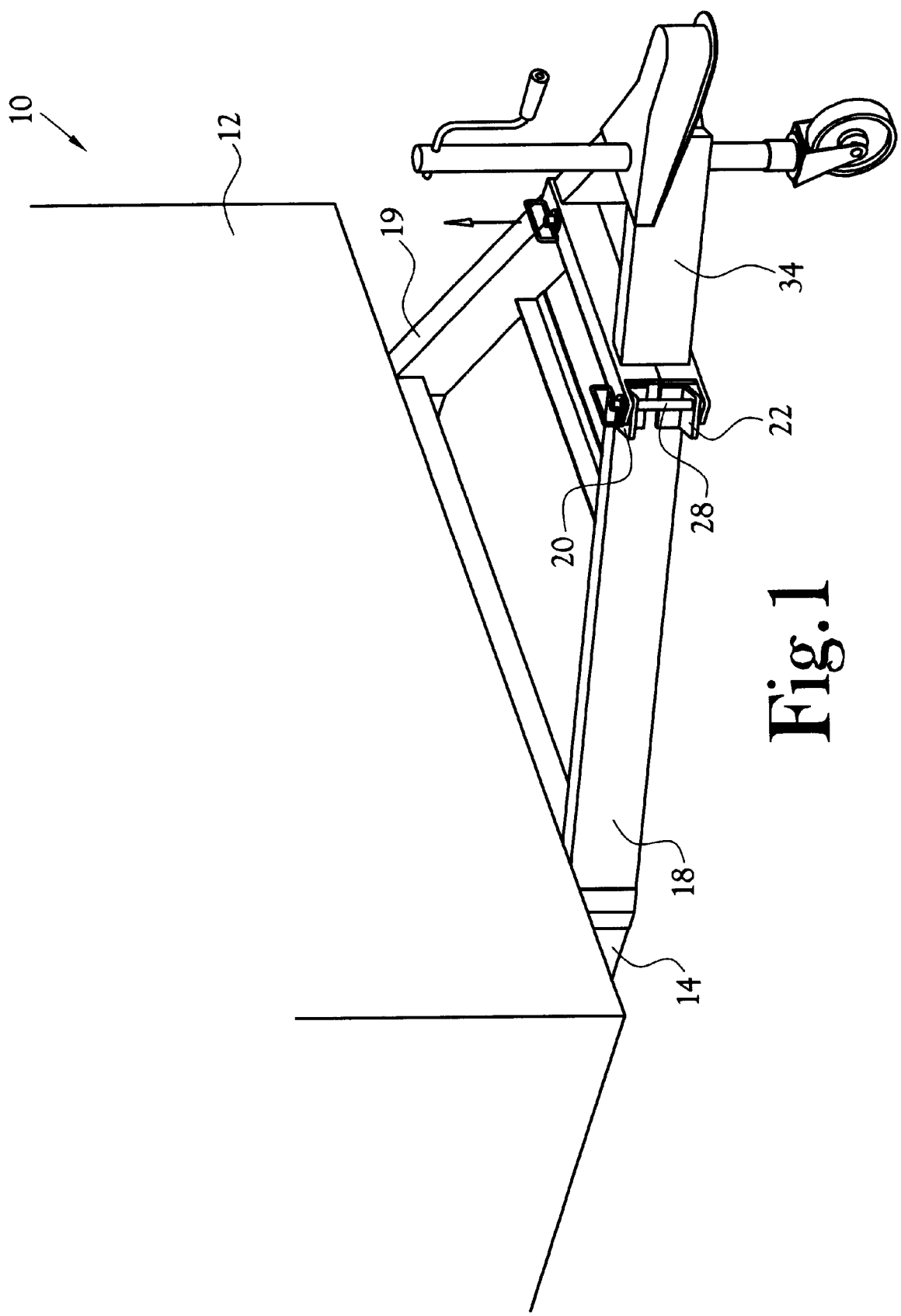
FIG. 1 is a perspective view of a trailer hitch in accordance with the present invention in a locked position.
Figure 2:
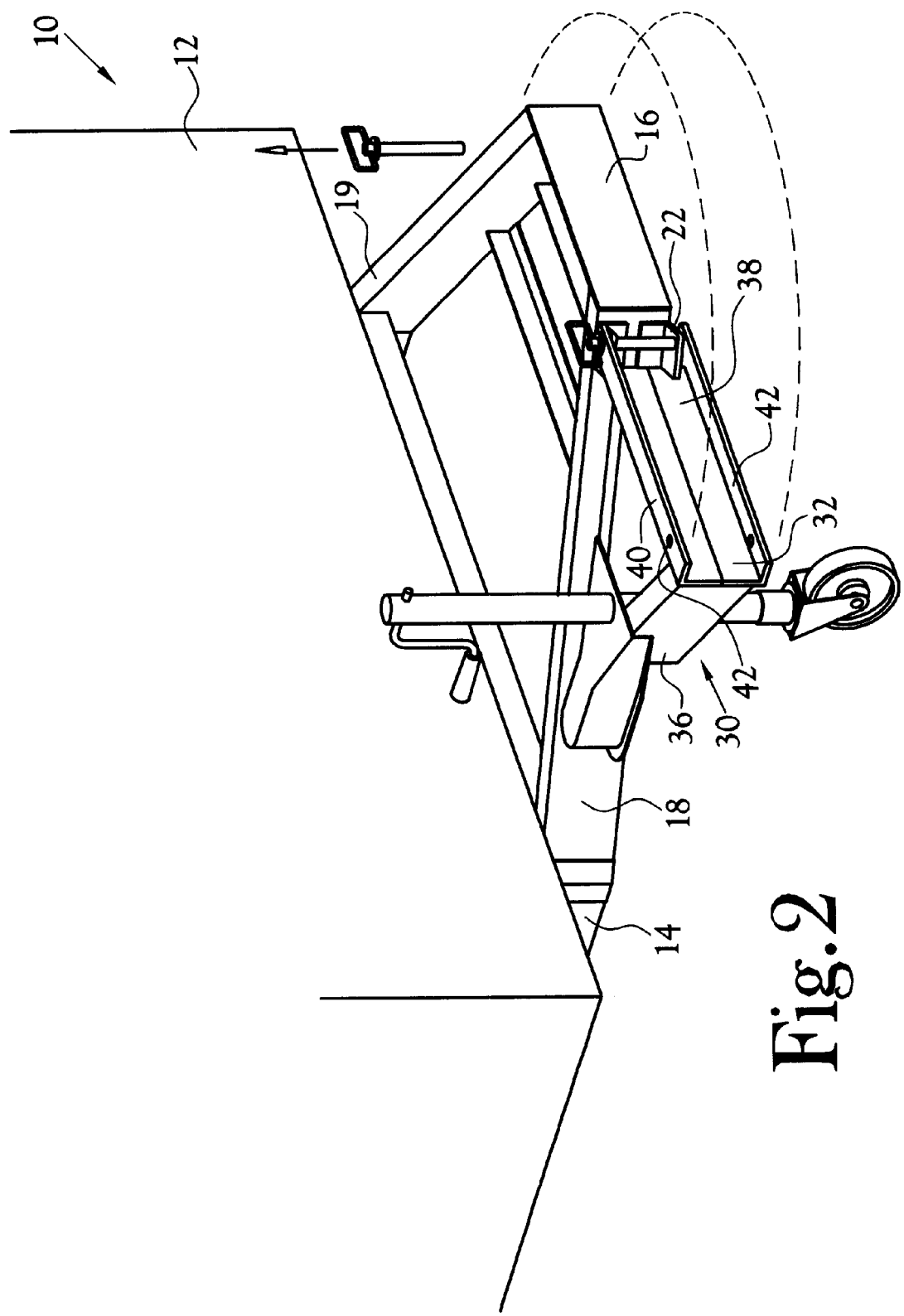
FIG. 2 is perspective view of a trailer hitch in accordance with the present invention in a pivoted position.
Figure 3:
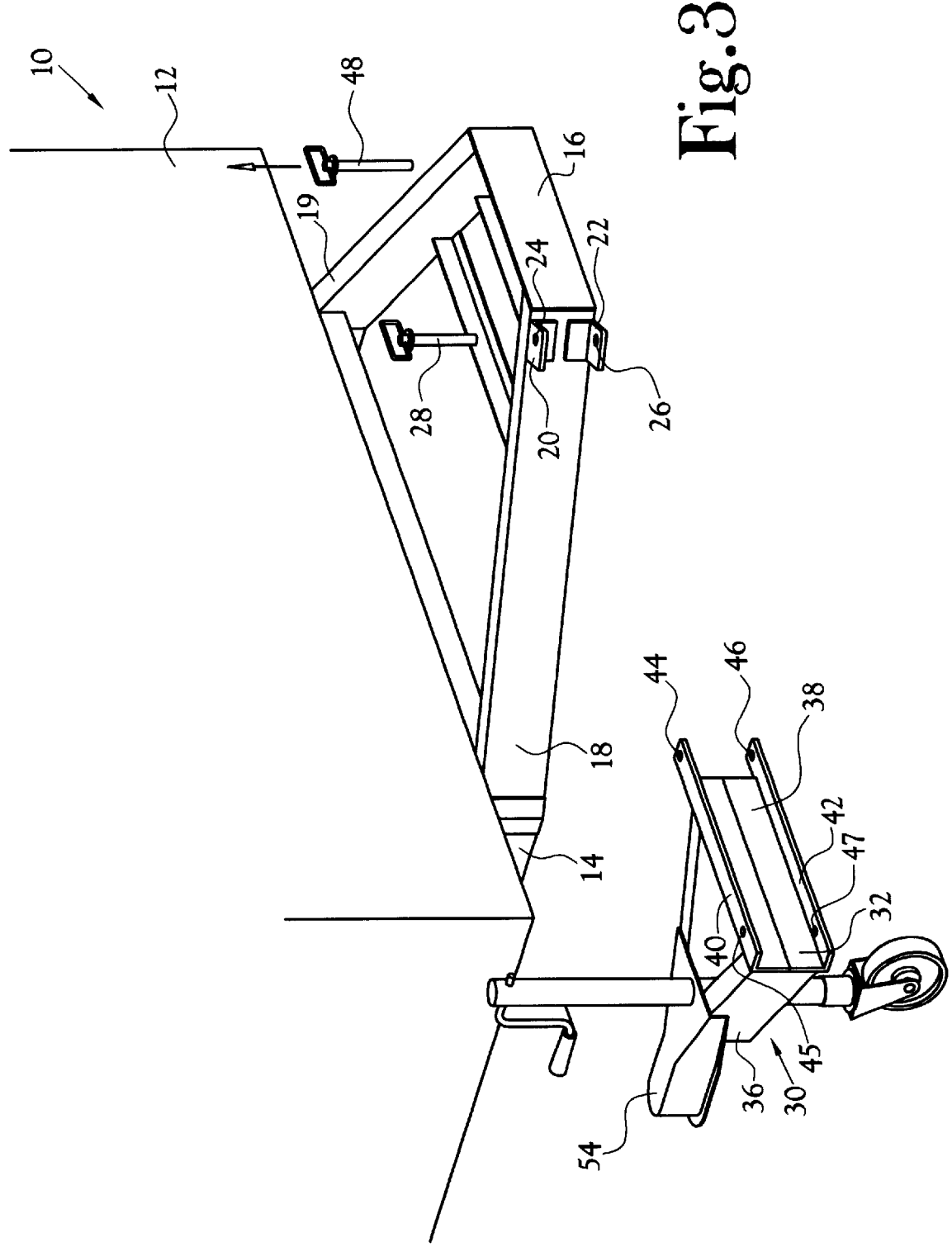
FIG. 3 is a perspective view of a trailer hitch in accordance with the present invention in a removed position.

Referring now to the Figures in which like reference numerals indicate like or corresponding features, there is depicted in FIG. 1 the front portion of a camping trailer 10. The body 12 of the camping trailer 10 is supported upon a steel frame 14, the front portion of which is generally trapezoidal in shape, terminating in a front plate 16 that is secured between a first tubular steel side rail 18 and a second tubular steel side rail 19. An upper bracket 20 and a lower bracket 22 are secured to the first tubular side rail 18, as by welding, adjacent to the front plate 16. An upper aperture 24 is defined in the upper bracket 20 and a lower aperture 26 is defined in the lower bracket 22. The upper aperture 24 and the lower aperture 26 are aligned coaxially and sized to slidingly receive a pivot pin 28.

A trailer hitch 30 is pivotally and removably attached to the frame 14. The trailer hitch 30 is generally triangular in shape, comprising an elongated cross member 32, having a first end 31 and a second end 33, an elongated first side member 34 and an elongated second side member 36. The elongated cross member 32 is generally c-shaped in cross section, comprising a plate 38, an upper flange 40 and a lower flange 42. The plate 38 is of a size and shape approximating the size and shape of the front plate 16. The upper flange 40 and the lower flange 42 are generally perpendicular to the plate 38, extending from the plate 38 in a direction opposite from the first side member 34 and the second side member 36. Adjacent to the first end 31 of the cross member 32, an upper pivot aperture 44 is defined in the upper flange 40 and a lower pivot aperture 46 is defined in the lower flange 42. The apertures 44 and 46 are coaxially aligned and spaced apart by a distance generally equivalent to the distance between the top of the upper bracket 20 and the bottom of the lower bracket 22. The apertures 44 and 46 are sized to slidably receive the pivot pin 28. An upper lock aperture 45 is defined in the upper flange 40 and a lower lock aperture 47 is defined in the lower flange 42. The apertures 45 and 47 are coaxially aligned and spaced apart from the plate 38 by a distance generally equivalent to the thickness of the front plate 16.

Figure 4:
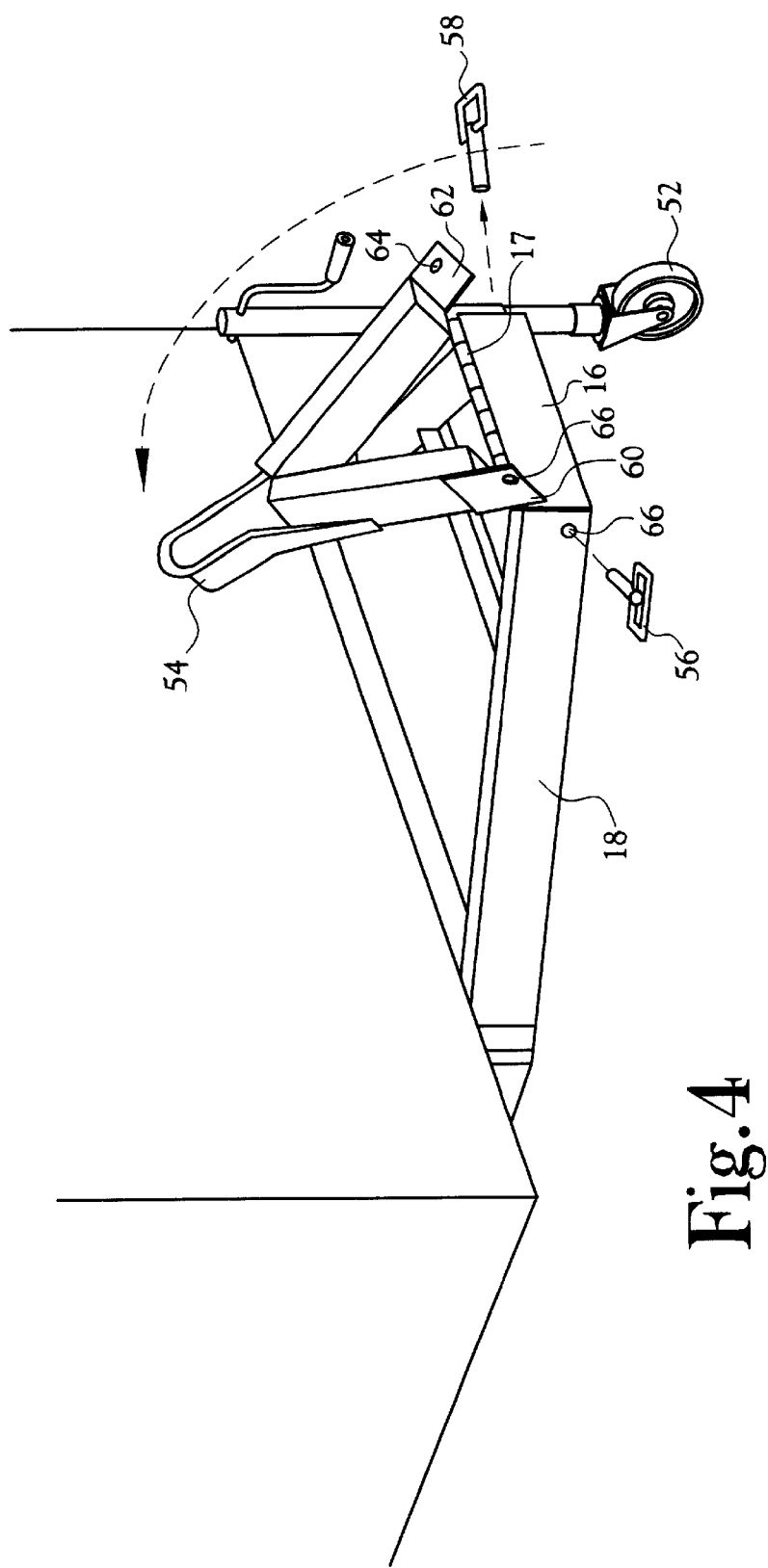
FIG. 4 is a perspective view of an alternative embodiment of a trailer hitch in accordance with the present invention in a pivoted position.
Figure 5:
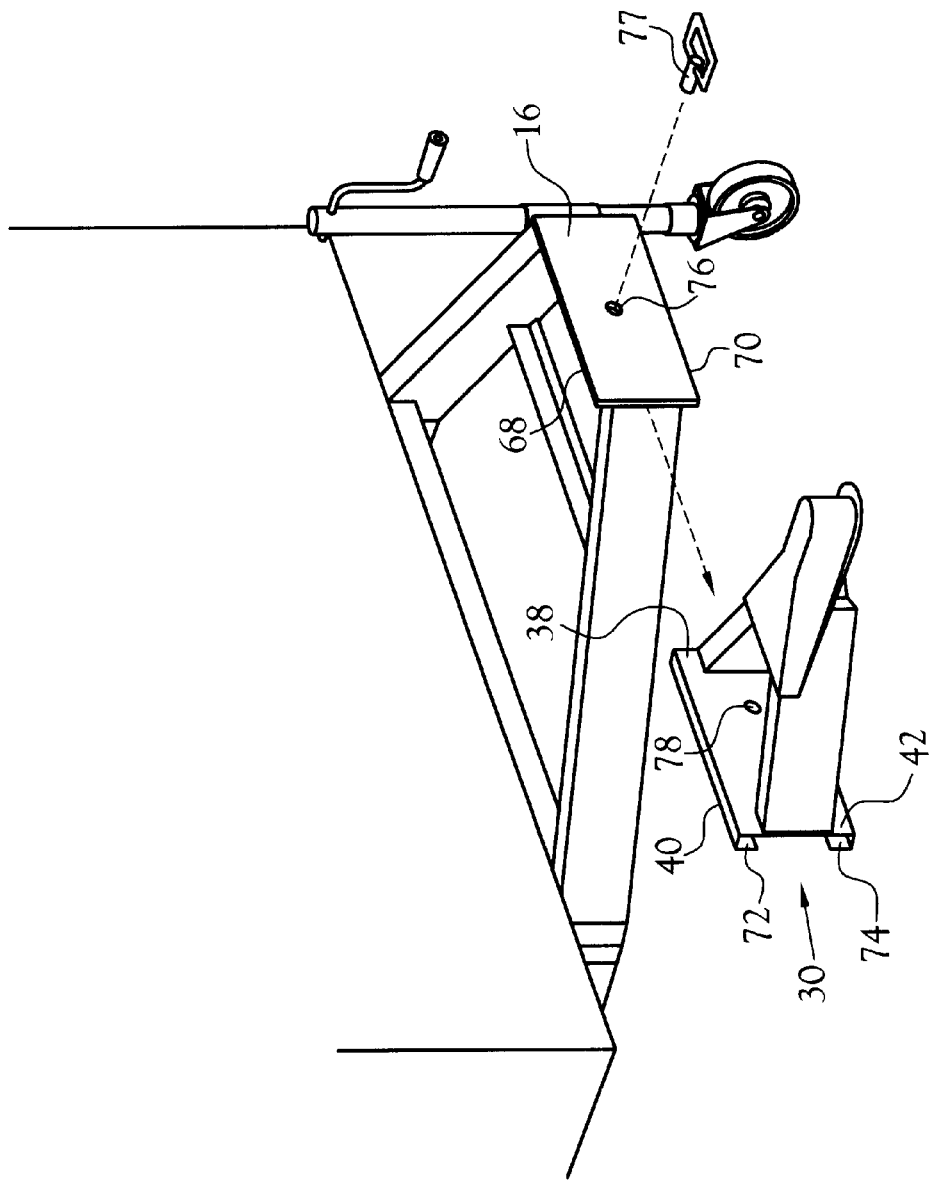
FIG. 5 is a perspective view of an alternative embodiment of a trailer hitch in accordance with the present invention in a removed position.

A retractable support post 50 is mounted adjacent to the intersection of the first side member 34 and the second side member 36. Alternatively, as depicted in FIGS. 4 and 5, the retractable support post 50 may be mounted upon the side rail 19. A wheel 52 is rotatably attached to the bottom end of the support post 50. Using mechanisms well known in the art, such as ratchets or screw threads, for example, the support post 50 is adjustable in effective height to maintain the frame 14 in a generally horizontal position when it is parked, but to move the wheel out of engagement with the ground when the trailer 10 is in transport.

A coupler 54 is mounted upon the hitch 30 at the intersection of the first side member 34 and the second side member 36. The coupler 54 is adapted to engage a ball, or other attachment mechanism well known in the art, that is secured to the frame of a towing vehicle.

In operation, when the hitch 30 is to be used for transporting the trailer 10, the cross member 32 is matingly engaged with the front plate 16 so that the upper flange 40 extends over the front plate 16, the lower flange 42 extends under the front plate 16 and the plate 38 contacts the front plate 16. The apertures 44 and 46 defined in the flanges 40 and 42, respectively, are coaxially aligned with the apertures 24 and 26 defined in the brackets 20 and 22, respectively. The pivot pin 28 is inserted through the apertures 24, 26, 44 and 46 to provide hinged engagement between the frame 14 and the hitch 30.

The lock pin 48 is inserted through the apertures 45 and 47 defined in the flanges 40 and 42, respectively, securing the front plate 16 between the lock pin 48 and the plate 38. In this condition, the frame 14 and the hitch 30 operate as a single unit without substantial relative movement between the frame 14 and the hitch 30.

When the trailer 10 is parked and it is desired to shorten the effective overall length of the trailer 10, the lock pin 48 is withdrawn and the hitch 30 is rotated about the pivot pin 28, rolling on the wheel 52. The support post remains effective for adjusting the frame to a horizontal position.

For those times when it is desired to prevent unauthorized movement of the trailer 10, both the lock pin 48 and the pivot pin 28 are removable to allow complete detachment of the hitch 30 from the frame 14. Without the hitch 30, the trailer cannot be towed with any conventional coupling mechanism. It will be recognized by those skilled in the art that a support post may be secured to the frame 14 to allow adjustment of the angle of the frame 14 in relation to the ground when the hitch 30 has been removed.

As depicted particularly in FIG. 4, in an alternative embodiment of the present invention, the hitch 30 may be pivotally attached to the front plate 16 along the upper edge 17, so that the hitch 30 can be pivoted to rest above the side rails 18 and 19. Ears 60 and 62 extend longitudinally from the side members 34 and 36, respectively, to overlay the side rails 18 and 19, respectively, when the hitch 30 is in a lowered position. An aperture 64 is defined in each of the ears 60 and 62 and an aperture 66 is defined in each of the side rails 18 and 19 adjacent to the front plate 16. The apertures 64 and 66 are sized and located to receive the lock pins 56 and 58 when the hitch 30 is in the lowered position.

In another alternative embodiment, depicted in FIG. 5, the front plate 16 includes an extended upper edge 68 and an extended lower edge 70. The upper flange 40 and the lower flange 42 of the hitch 30 are L-shaped to define an upper channel 72 and a lower channel 74. The upper channel 72 and the lower channel 74 are sized to slidingly receive the edges 68 and 70, respectively, of the front plate 16. An aperture 76 is defined in the front plate 16 and an aperture 78 is defined in the plate 38. The apertures 76 and 78 are sized and located to align and receive the lock pin 77 when the hitch 30 is slid into position over the front plate 16.

In an additional alternative embodiment, depicted in FIG. 6, a C-shaped channel 80 is mounted longitudinally upon the steel frame 14 under the body 12. A C-shaped channel 82 is mounted longitudinally upon the steel frame 14 under the body 12 in parallel and opposing relationship to the channel 80. The channels 80 and 82 are sized and spaced apart to slidingly receive extensions 84 and 86 of the hitch 87. An aperture 88 is defined in the channel 80 and an aperture 90 is defined in the channel 82 Apertures, not shown, are sized and located in the extensions 84 and 86 in positions to receive locking pins 92 and 94 when the hitch 30 is in an extended position. When the pins 92 and 94 are removed, the extensions 84 and 86 can slide through the channels 80 and 82, respectively, to retract the hitch 87 under the trailer. Alternatively, the hitch 87 may be removed from the trailer by sliding the extensions 84 and 86 out of the channels 80 and 82, respectively.

A hitch in accordance with the present invention is secure for transport, yet provides the flexibility of adjusting the effective length of a camping trailer while parked and continues to provide the leveling features of a support post. In addition, the hitch is removable to prevent unauthorized towing of the trailer.

While preferred embodiments have been shown and described, it will be understood that there is no intention to limit the disclosure, but rather the disclosure is intended to cover all modifications and alternate methods and apparatus within the spirit and scope of the invention as defined in the appended claims.

We claim:

1. A trailer hitch pivotally attached to a trailer frame defining at least one aperture, said trailer hitch being pivotable through an angle of about 180 degrees relative to said trailer frame and comprising:

an elongated cross member having a first end and a second end;

first side member extending from said first end of said elongated cross member to a coupler;

a second side member extending from said second end of said elongated cross member to said coupler;

an aperture defined in said trailer hitch, said aperture being located in said trailer hitch in a position of coaxial alignment with said aperture defined in said frame when the trailer hitch is in a towing position; and a removable lock pin adapted to extend through said aligned apertures to secure said trailer hitch in a fixed position relative to said frame.

2. A trailer hitch as defined in claim 1 wherein said trailer hitch is pivotally attached to said trailer frame.

3. A trailer hitch as defined in claim 1 wherein said cross member includes an upper flange and a lower flange and lock apertures are defined in said upper flange and said lower flange.

4. A trailer hitch as defined in claim 1 wherein said frame includes a bracket and said aperture defined in said frame is defined in said bracket.

5. A trailer hitch as defined in claim 3 wherein said cross member is generally C-shaped in cross section to wrap substantially around a plate member in said frame when said lock pin is engaged with said lock apertures.

6. A trailer hitch as defined in claim 1 wherein said cross member is slidably mounted upon said frame.

7. A trailer hitch in accordance with claim 1 wherein said cross member is attached to said frame with a hinge.

8. A trailer hitch in accordance with claim 1 wherein said trailer hitch is slidingly mounted upon said frame.

9. A trailer hitch releasably attached to a trailer frame defining at least one aperture, said trailer hitch comprising:

an elongated cross member having a first end and a second end, said cross member being generally C-shaped in cross section to wrap substantially around a plate member in said frame when said lock pin is engaged with said lock apertures and comprising an upper flange and a lower flange and lock apertures are defined in said upper flange and said lower flange; a first side member extending from said first end of said elongated cross member to a coupler;

a second side member extending from said second end of said elongated cross member to said coupler;

an aperture defined in said trailer hitch, said aperture being located in said trailer hitch in a position of coaxial alignment with said aperture defined in said frame when the trailer hitch is in a towing position; and a removable lock pin adapted to extend through said aligned apertures to secure said trailer hitch in a fixed position relative to said frame.

* * * * *